United States Patent
Kato et al.

[11] Patent Number: 6,134,048
[45] Date of Patent: *Oct. 17, 2000

[54] BINOCULARS WITH A CONVERGENCE ANGLE CORRECTION MECHANISM

[75] Inventors: Masato Kato, Otsu; Kazuo Kimura, Sakai, both of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/740,874

[22] Filed: Nov. 4, 1996

[30] Foreign Application Priority Data

Nov. 8, 1995 [JP] Japan ................................ 7-289970
Nov. 17, 1995 [JP] Japan ................................ 7-299778

[51] Int. Cl.[7] ........................................... G02B 23/00
[52] U.S. Cl. ......................... 359/407; 359/412; 359/418
[58] Field of Search .............................. 359/407, 418, 359/425, 480, 482, 412, 413

[56] References Cited

U.S. PATENT DOCUMENTS

| | | | |
|---|---|---|---|
| 959,739 | 5/1910 | Heckel | 359/413 |
| 1,358,721 | 11/1920 | Fuji | 359/829 |
| 4,264,122 | 4/1981 | Schmidt et al. | 359/412 |
| 4,886,340 | 12/1989 | Kanda | 359/411 |

FOREIGN PATENT DOCUMENTS

| | | | |
|---|---|---|---|
| 636916 | 7/1994 | European Pat. Off. | |
| 1203010 | 10/1965 | Germany | 359/407 |
| 55-52010 | 4/1980 | Japan | |
| 5107444 | 4/1993 | Japan | |
| 777659 | 3/1995 | Japan | |

*Primary Examiner*—Cassandra Spyrou
*Assistant Examiner*—Mark A. Robinson
*Attorney, Agent, or Firm*—Price, Gess & Ubell

[57] ABSTRACT

A binocular has a focusing mechanism and a convergence angle correction mechanism. Focusing is achieved by moving an objective optical system or eyepiece optical system along an optical axis. The convergence angle correction mechanism, which is interlocked with the focusing mechanism, decenters an element of the objective optical system translationally with respect to the optical axis. The translational decentering is achieved by moving the objective optical element in a direction at an angle to the optical axis.

14 Claims, 16 Drawing Sheets

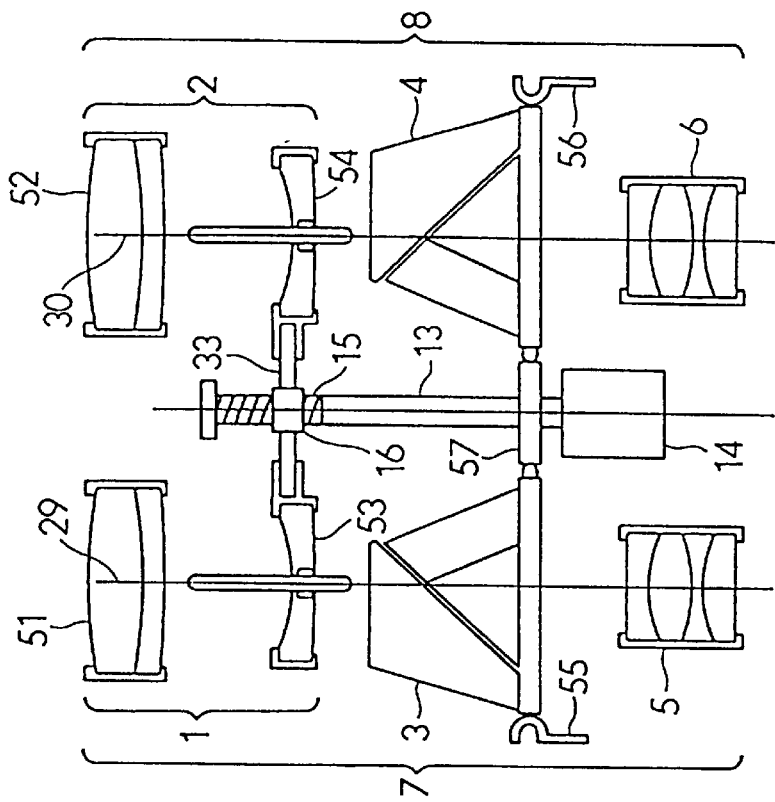
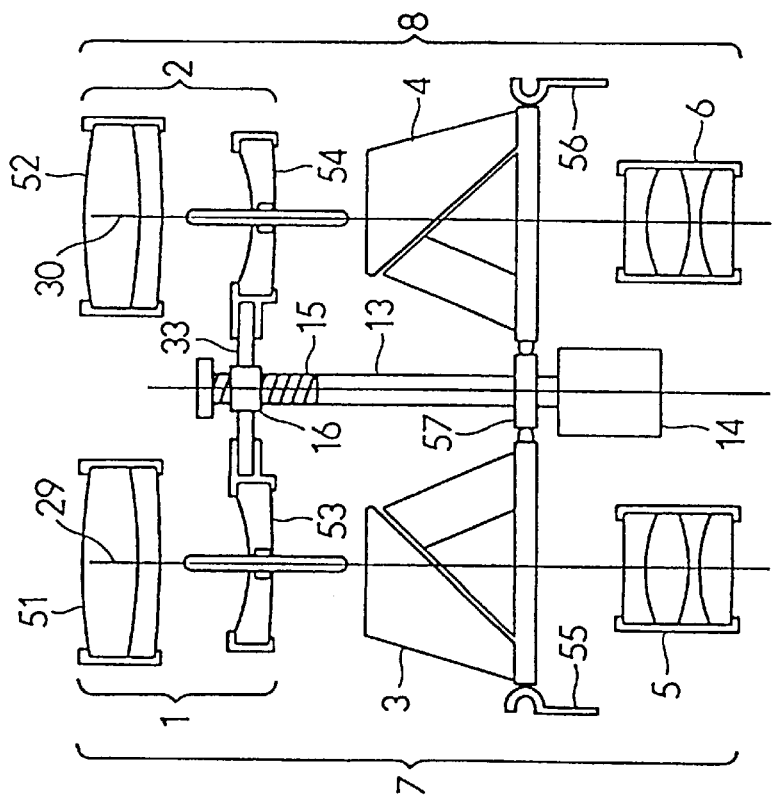
FIG. 7A
FIG. 7B

BINOCULARS WITH A CONVERGENCE ANGLE CORRECTION MECHANISM

BACKGROUND OF THE INVENTION

1. Field of the Invention

The present invention relates to binoculars that can be used for viewing objects at close distances.

2. Description of the Prior Art

It will be convenient if binoculars can be used not only for viewing objects in distant places but also for viewing objects at distances as close as about one meter, because binoculars can then be used for observing plants outdoors or for observing exhibits at an exhibition. However, when an object at a close distance is viewed at a high magnification, the convergence angle (the angle of the light beams exiting from the right and left eyepiece systems) becomes very large. For example, when an observer views an object at a distance of one meter using binoculars having a magnification of 10×, the observer needs to turn the eyes inward (make the eye axes converge) so much as if viewing an object at a distance of 10 cm before the eyes. This greatly strains the observer's eyes. Moreover, in such a situation, some people simply cannot merge the right and left images into one. For this reason, as disclosed in the publication of Japanese Laid-Open Patent Application No. H5-107444, there have been proposed binoculars that can correct the convergence angle at close distances by varying the distance between the objective optical systems by means of a decentering means which is interlocked with a focusing mechanism.

However, in the above mentioned conventional binoculars, the decentering mechanism that varies the distance between the objective optical systems needs to be so constructed that it is capable of inclining the whole lens barrels including objective and eyepiece optical systems. To allow the whole lens barrels to be moved, it is necessary to provide an unduly large and complicated mechanism. To allow large components to be moved, it is necessary to increase the strength of related components. As a result, such a construction inevitably makes binoculars larger and heavier.

Moreover, in the above mentioned conventional binoculars, if the convergence angle is corrected completely, it becomes zero when the binoculars are focused on an object at a finite distance, thereby making the observer feel as if viewing an object at an infinite distance. The observer feels this unnatural, because, even though the observer is conscious of viewing an object at a close distance, the axes of the observer's eyes remain parallel to each other. Especially, when the observer suddenly turns the eyes from a distant object to a close object, the observer unconsciously tries to turn the eyes inward (make the eye axes converge to adapt to a convergence angle that is expected to be formed) even though, in reality, the convergence angle of the light beams exiting from the binoculars remains zero. As a result, it is difficult for the observer to merge the right and left images into one.

Furthermore, in common binoculars, the state of focusing depends not only on the distance of an object but also on the dioptric power of the observer. Therefore, if correction of the convergence angle is interlocked with a focusing mechanism in such a way that correction is performed completely, a farsighted observer, who has a positive dioptric power, will have to make the eye axes even diverge. The reason is as follows. For example, in order for an observer having a diopter of +2 to focus on a scene at an infinite distance using binoculars having a magnification of 10×, it is necessary to adjust the focusing mechanism as if an observer having a diopter of zero were viewing an object at a distance of 50 m. In this case, since the object is at an infinite distance, it is actually not necessary to correct the convergence angle in order to make the light beams exiting from the eyepieces parallel. Nevertheless, since the convergence angle correction mechanism is interlocked with the focusing mechanism, it does correct the convergence angle as if the object were at a distance of 50 m, that is, it over-corrects the convergence angle. Convergence angle correction is originally meant to allow the eye axes to be close to parallel rather than to converge when an object is at a close distance, but, under the state of over-correction, it goes so far as to require the eye axes to diverge rather than to be parallel. Since most people can only adapt to situations in which the eye axes are required to be parallel or converging, continuous use of binoculars in a situation as described above, where the eye axes are required to be diverging, greatly strains the eyes. Moreover, in the cases where the convergence angle is corrected by translational or angular decentering of lenses or by means of prisms, as the amount of decentering or the angle of the prisms is increased in an attempt to achieve a greater correction effect, the quality of obtained images deteriorates. This is especially undesirable when objects at far distances are observed, because such objects tend to form relatively intricate images.

SUMMARY OF THE INVENTION

An object of the present invention is to provide a binocular in which correction of the convergence angle at close distances is achieved with a simple, compact and light construction whose movable components are relatively small.

Another object of the present invention is to provide a binocular that does not make the observer feel unnaturalness even when an object at a close distance is observed.

Still another object of the present invention is to provide a binocular that does not require observers of certain diopters to make the eye axes diverge and thus alleviates strain to the eyes.

To achieve the above objects, according to one aspect of the present invention, a binocular is provided with an objective optical element; a focusing mechanism for varying a dioptric power of the binocular; and a moving mechanism interlocked with said focusing mechanism, for moving said objective optical element so that it is decentered translationally with respect to an optical axis.

According to another aspect of the present invention, a binocular is provided with an objective optical element; and a moving mechanism for moving said objective optical element in a direction at an angle to an optical axis.

According to still another aspect of the present invention, a binocular is provided with a focusing mechanism for varying a dioptric power of the binoculars; and a convergence angle correction mechanism interlocked with said focusing mechanism, for correcting a convergence angle of the binocular. Here, said convergence angle correction mechanism is so constructed that it leaves a predetermined degree of convergence angle uncorrected.

According to a further aspect of the present invention, a binocular is provided with a focusing mechanism for varying a dioptric power of the binocular; and a convergence angle correction mechanism interlocked with said focusing mechanism, for correcting a convergence angle of the binoculars only when said focusing mechanism adjusts the dioptric power to a distance closer than a predetermined distance.

BRIEF DESCRIPTION OF THE DRAWINGS

This and other objects and features of this invention will become clear from the following description, taken in conjunction with the preferred embodiments with reference to the accompanied drawings in which:

FIG. 7A is a plan view showing the internal construction in the infinite-distance state of the binoculars of a third embodiment of the present invention;

FIG. 7B is a plan view showing the internal construction in the close-distance state of the binoculars of the third embodiment;

DESCRIPTION OF THE PREFERRED EMBODIMENTS

First Embodiment

Figure 1A:
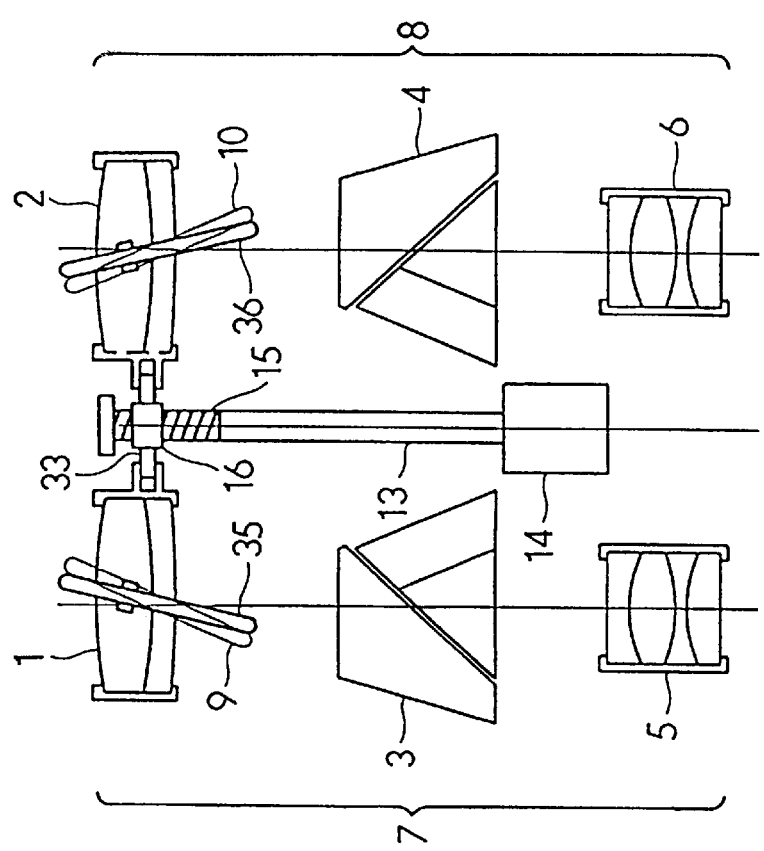
FIG. 1A is a plan view showing the internal construction in the infinite-distance state of the binoculars of a first embodiment of the present invention.
Figure 1B:
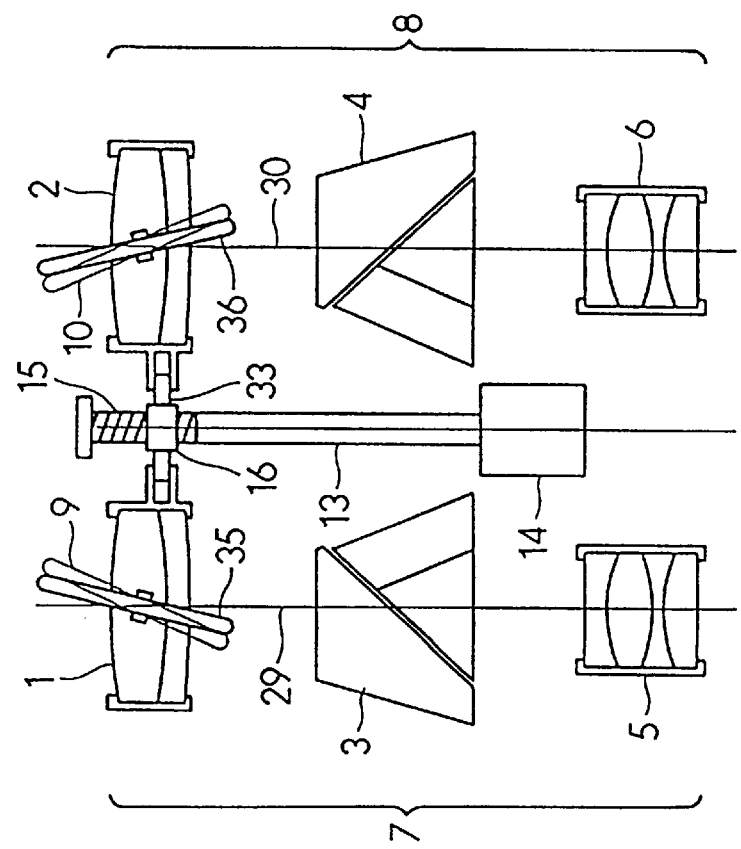
FIG. 1B is a plan view showing the internal construction in the close-distance state of the binoculars of the first embodiment.
Figure 2:
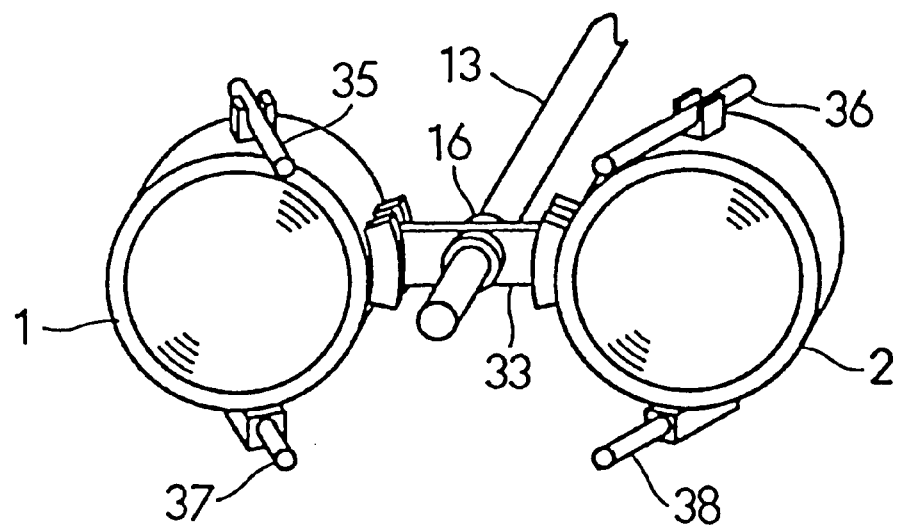
FIG. 2 is a front view of the binoculars of the first embodiment.

FIGS. 1A, 1B, and 2 show binoculars of a first embodiment of the present invention. FIG. 1A is a plan view showing the internal construction of the binoculars in the infinite-distance state, FIG. 1B is a plan view showing the internal construction of the binoculars in the close-distance state, and FIG. 2 is a perspective front view of the binoculars. The binoculars of this embodiment are provided with a pair of optical systems 7 and 8, comprising objective optical systems 1 and 2, erecting prism systems 3 and 4, and eyepiece optical systems 5 and 6, and have a magnification of 10×. The binoculars are further provided with a focusing mechanism, which is constructed as follows. When a focusing axle 13 is rotated by operating a focusing ring 14 fixed on the focusing axle 13, then, with the help of a threaded portion 15 on the focusing axle 13 and a nut 16 thread-engaged therewith, a wing plate 33 that is fixed to the nut 16 and extends to the right and left moves along the focusing axle 13. As a result, the objective optical systems 1 and 2, which are engaged with the wing plate 33 by driven sectors that are formed to hold the wing plate 33 from its front and rear sides, move along the focusing axle 13, and thus focusing is achieved. Meanwhile, the objective optical systems 1 and 2 move along guide bars 35 and 36, which are disposed at an angle to optical axes 29 and 30 on a plane that includes the optical axes 29 and 30. In order to prevent rotation about the guide bars 35 and 36, auxiliary bars 37 and 38 are provided parallel to the guide bars 35 and 36. Accordingly, the objective optical systems 1 and 2 move obliquely, decentering themselves translationally with respect to the optical axes 29 and 30. Note that, although the driven sectors hold the wing plate 33 from its front and rear sides, they allow the wing plate 33 to move freely in its lengthwise direction (right-left direction) so that the objective optical systems 1 and 2 can be decentered.

Figure 3:
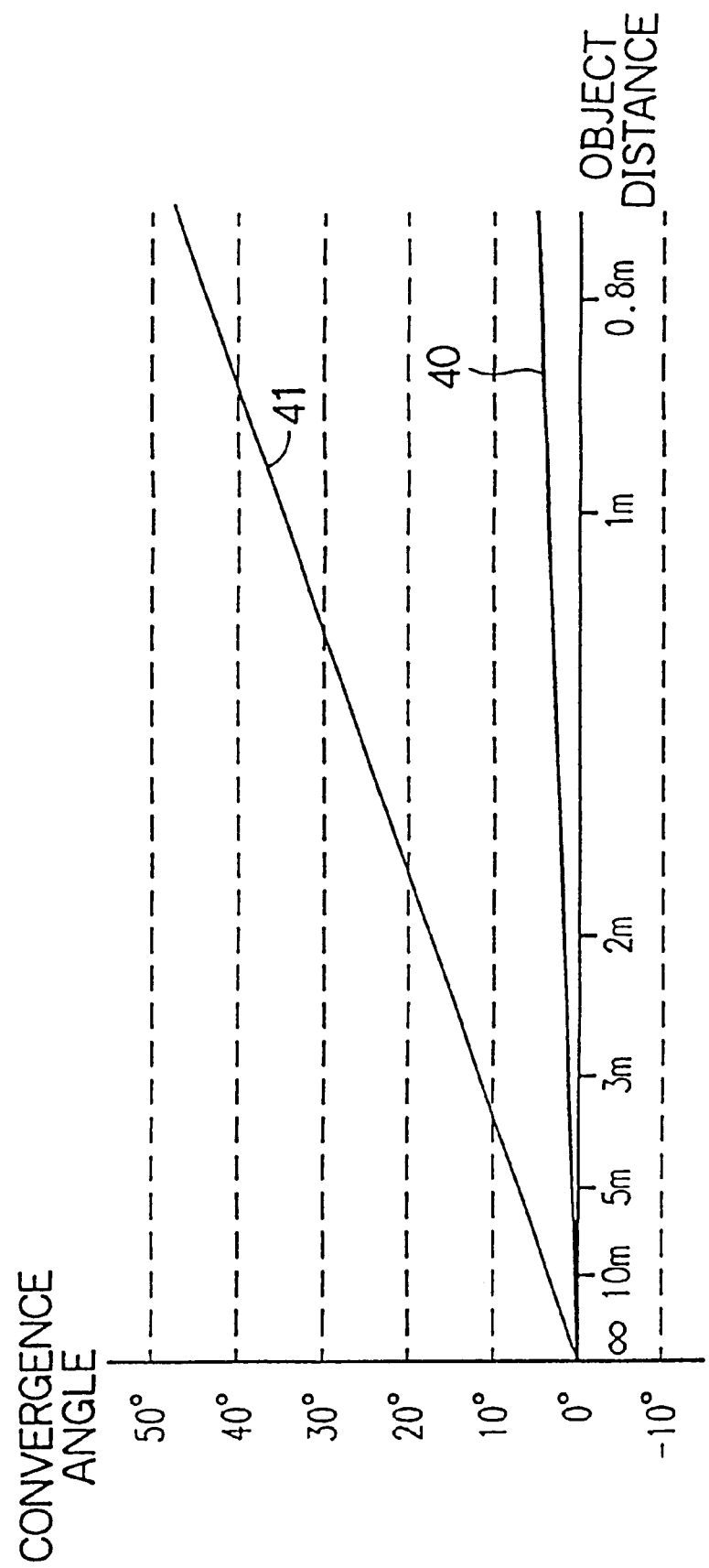
FIG. 3 is a diagram showing the relationship between object distance and convergence angle in the first embodiment.

According to the above described construction, at close distances, when the focusing axle 13 is rotated, the objective optical systems 1 and 2 move to achieve focusing. At the same time, the distance between the two objective optical systems 1 and 2 is decreased as a result of translational decentering with respect to the optical axes 29 and 30, and thus the convergence angle at close distances is corrected. Here, if the angle at which the guide bars 35 and 36 and the auxiliary bars 37 and 38 are disposed is increased as indicated by reference numerals 9 and 10 in FIG. 1, the convergence angle is completely corrected to be always zero irrespective of the object distance. However, in this embodiment, the angle of the auxiliary bars 37 and 38 is made smaller than that, so that a part of the convergence angle is left uncorrected even at close distances. FIG. 3 shows the relationship between object distance and convergence angle in this embodiment. There, the graph 41 represents a comparison example in which the convergence angle is not corrected at all.

In the comparison example 41, the convergence angle exceeds 40° at the closest possible distance of 0.8 m, causing much strain to the eyes. If the convergence angle is corrected completely, the graph will lie just on the horizontal reference axis. In this case, the convergence angle remains zero even at the closest possible distance of 0.8 m, causing the observer to feel unnaturalness. By contrast, in this embodiment, the convergence angle is corrected in such a way that the same degree of convergence angle as is experienced without binoculars is left uncorrected. The relationship between object distance and convergence angle in this embodiment is shown by the graph 40.

Second Embodiment

Figure 4A:
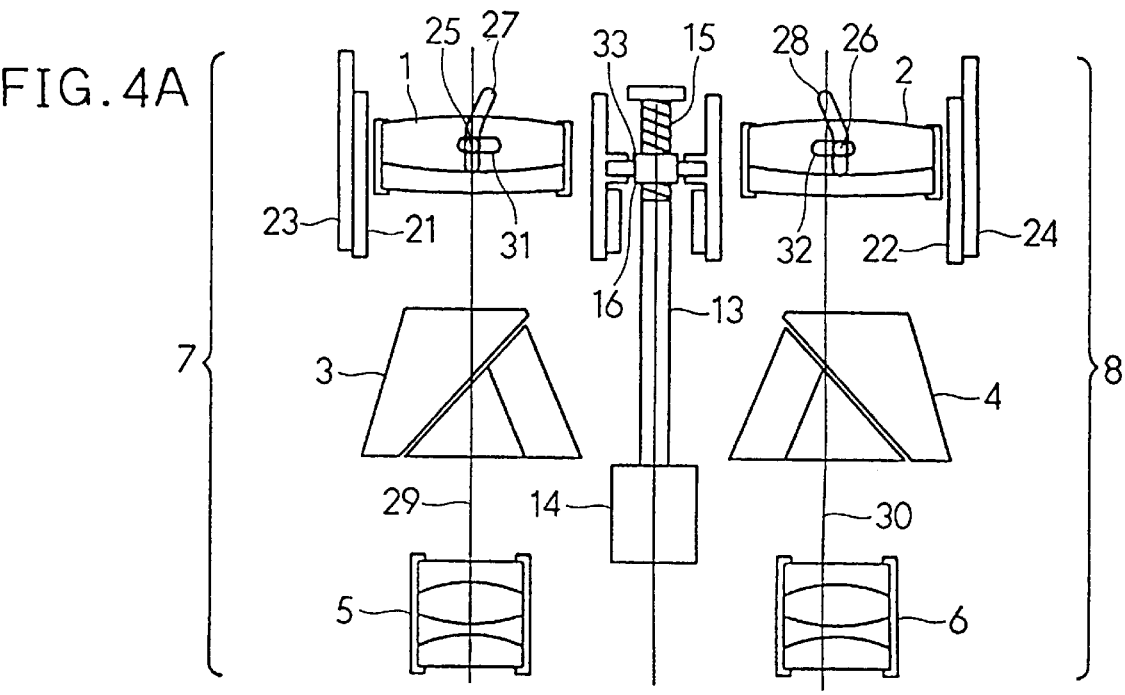
FIG. 4A is a plan view showing the internal construction in the infinite-distance state of the binoculars of a second embodiment of the present invention.
Figure 4B:
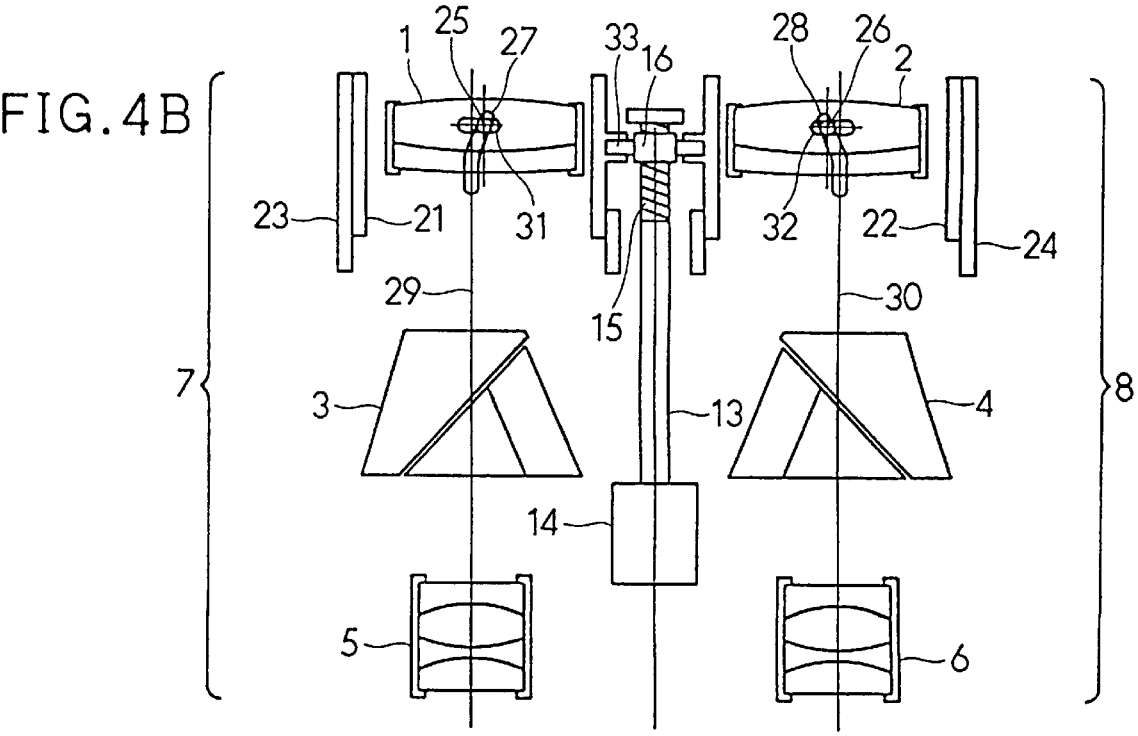
FIG. 4B is a plan view showing the internal construction in the close-distance state of the binoculars of the second embodiment.
Figure 5:
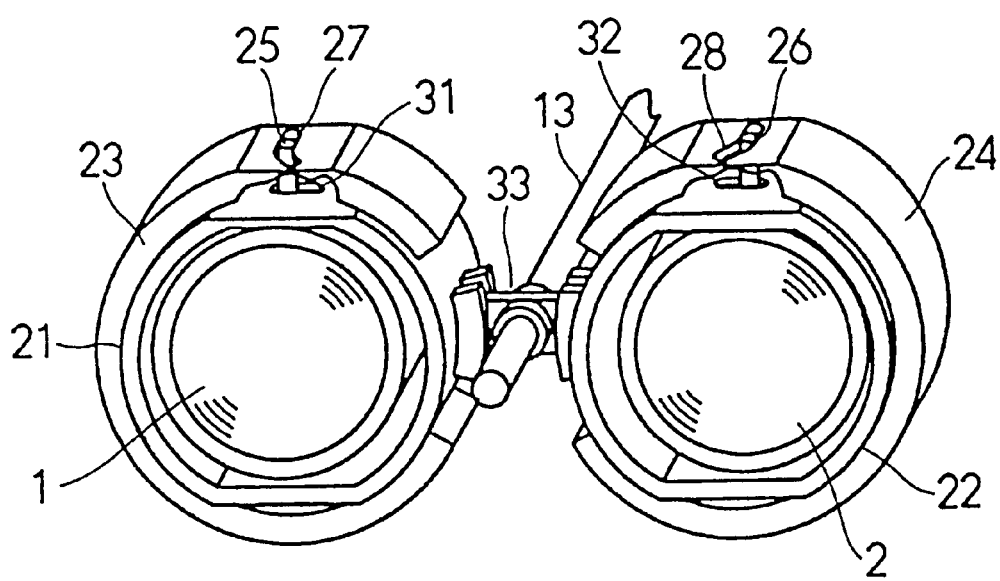
FIG. 5 is a perspective view of the portion around the objective optical systems of the binoculars of the second embodiment.

FIGS. 4A, 4B, and 5 show binoculars of a second embodiment of the present invention. FIG. 4A is a plan view showing the internal construction of the binoculars in the infinite-distance state, FIG. 4B is a plan view showing the internal construction of the binoculars in the close-distance state, and FIG. 5 is a perspective front view of the binoculars. The binoculars of this embodiment are provided with a pair of optical systems 7 and 8, comprising objective optical systems 1 and 2, erecting prism systems 3 and 4, and eyepiece optical systems 5 and 6, and have a magnification of 10×. The binoculars are further provided with a focusing mechanism, which is constructed as follows. A wing plate 33 is fixed to a nut 16, which is thread-engaged with a threaded portion 15 at the end of a focusing axle 13. With the wing plate 33, driven sectors formed on objective barrels 21 and 22 that accommodate the objective optical systems 1 and 2 are engaged, just as in the first embodiment. The objective barrels 21 and 22 are accommodated in lens barrels 23 and 24 in such a way that they can be moved along optical axes 29 and 30. Moreover, the objective optical systems 1 and 2 are arranged in the objective barrels 21 and 22 in such a way that they can be moved in a direction perpendicular to the optical axes 29 and 30. This is achieved with the help of pins 25 and 26 that are fixed on the objective optical systems 1 and 2 and are guided along laterally extending grooves 31 and 32 provided in the upper parts of the objective barrels 21 and 22. Furthermore, the pins 25 and 26 are also engaged with cam grooves 27 and 28 provided in the lens barrels 23 and 24. The cam grooves 27 and 28 are designed to be parallel to the optical axes 29 and 30 in the range of object distances from infinite to 5 m, and to be at an angle with the optical axes 29 and 30 in the range of object distances from 5 m to the closest possible distance of 0.8 m.

Figure 6:
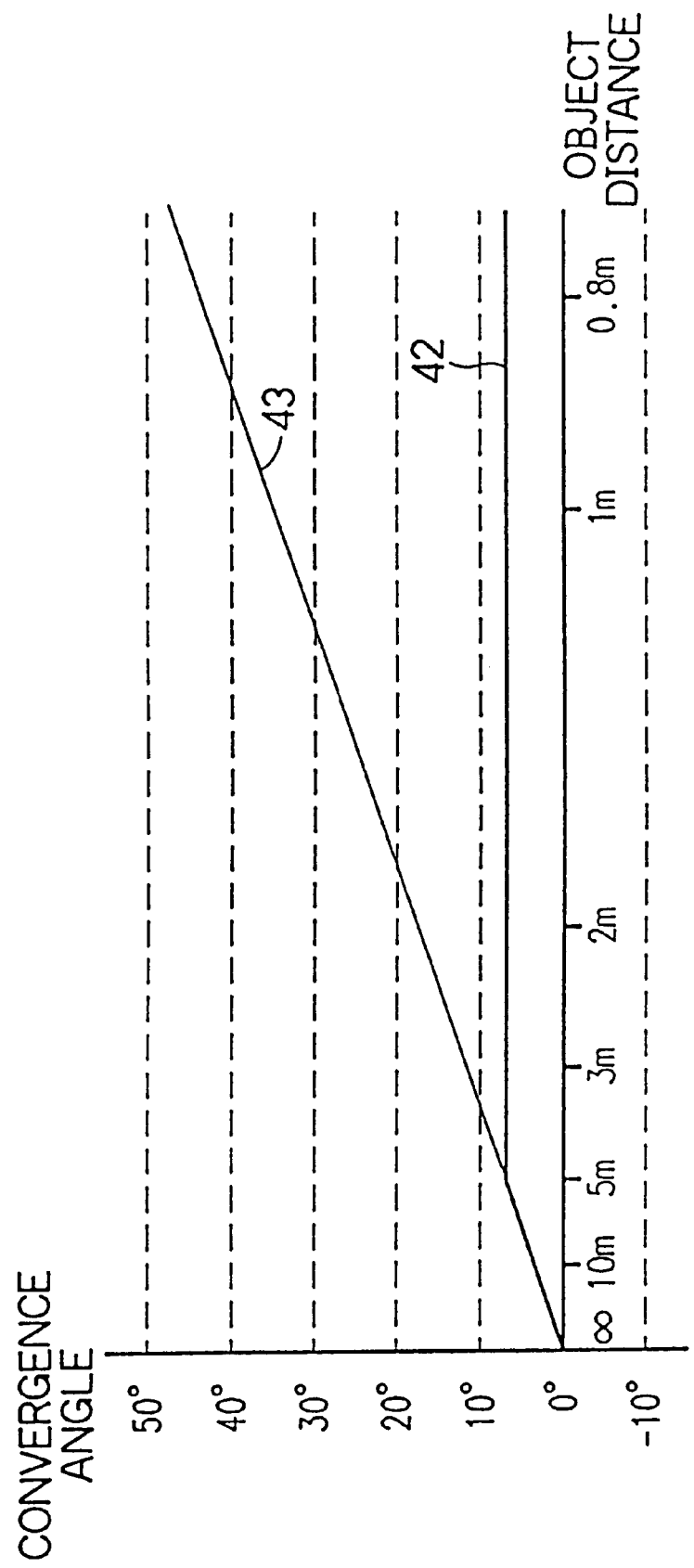
FIG. 6 is a diagram showing the relationship between object distance and convergence angle in the second embodiment.

According to the above described construction, as shown in FIG. 4B, at close distances, when the focusing axle 13 is rotated by rotating a focusing ring 14 fixed on the focusing axle 13, the wing plate 33 moves along the focusing axle 13 with the help of the threaded portion 15 and the nut 16. As a result, the objective optical systems 1 and 2, guided by the lens barrels 23 and 24, move in the same direction, and thus focusing is achieved. At the same time, with the help of the pins 25 and 26 guided along the cam grooves 27 and 28, the objective optical systems 1 and 2 are decentered translationally with respect to the optical axes 29 and 30. When the object distance is in the range from infinite to 5 m, the amount of translational decentering is zero, and accordingly the convergence angle is not corrected. As the object distance varies from 5 m to the closest possible distance of 0.8 m, the amount of translational decentering is gradually increased in order to decrease the distance between the right and left objective optical systems 1 and 2. Thus, the convergence angle at close distances is corrected. FIG. 6 shows the relationship between object distance and convergence angle in this embodiment. There, the graph 43 represents the case where the convergence angle is not corrected at all. In this case, the convergence angle exceeds 40° at the closest possible distance of 0.8 m, causing much strain to the eyes. The convergence angle is corrected completely if the cam grooves 27 and 28 are designed to be at an angle to the optical axes 29 and 30 even in the range of object distances from infinite and 5 m. In this case, however, an observer having a diopter other than zero cannot achieve focusing at an infinite distance without making the eye axes diverge, which greatly strains the eyes. In this embodiment, as shown by the graph 42, the convergence angle is not corrected in the range of object distances from infinite to 5 m, and is corrected in the range of object distances from 5 m to 0.8 m, which is the closest possible distance within the range in which focusing is possible, so as not to exceed 7.3°. Such a construction makes it possible to prevent strain to the eyes as caused by a large convergence angle at close distances, or as caused by making the eye axes diverge when an observer of a positive diopter uses the binoculars at nearly infinite distances. Furthermore, it is possible to eliminate deterioration of images as caused by decentering of lenses for convergence angle correction at far distances, where images tend to be intricate.

Third Embodiment

Figure 8:
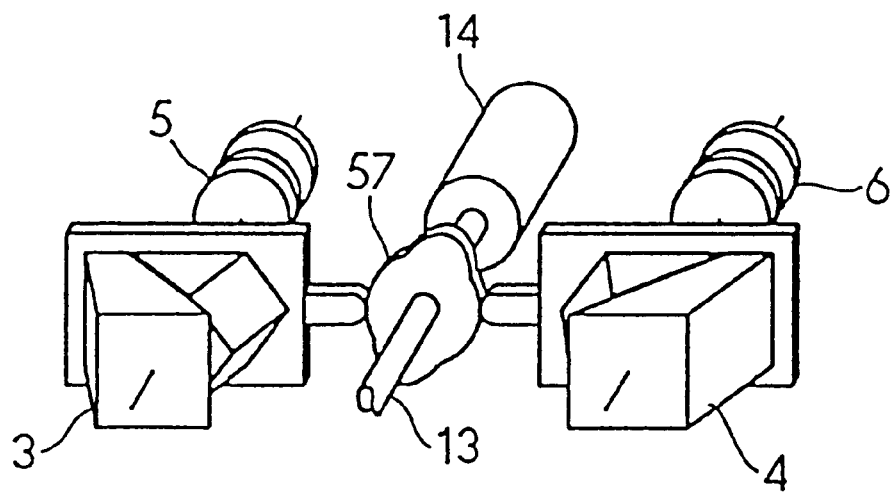
FIG. 8 is a perspective view of the portion around the erecting prisms of the binoculars of the third embodiment.
Figure 9:
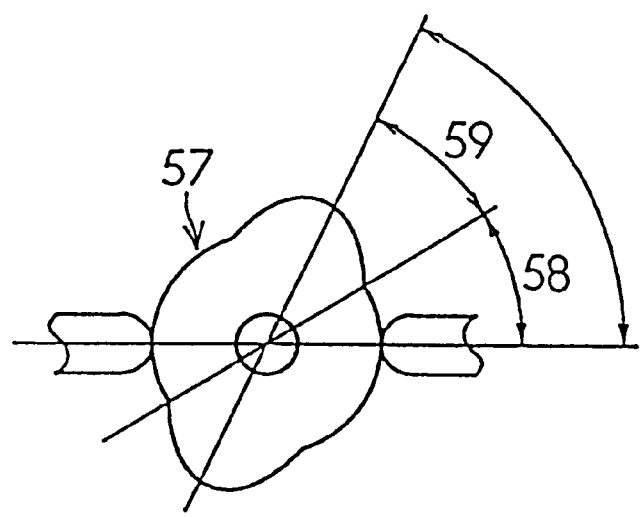
FIG. 9 is a front view of the cam used in the binoculars of the third embodiment.

FIGS. 7A, 7B, and 8 show binoculars of a third embodiment of the present invention. FIG. 7A is a plan view showing the internal construction of the binoculars in the infinite-distance state, FIG. 7B is a plan view showing the internal construction of the binoculars in the close-distance state, and FIG. 8 is a perspective view of the portion around the erecting prisms. The binoculars of this embodiment are provided with a pair of optical systems 7 and 8, comprising objective optical systems 1 and 2, erecting prism systems 3 and 4, and eyepiece optical systems 5 and 6, and have a magnification of 10×. Here, the objective optical systems 1 and 2 comprise front lens units 51 and 52 having a positive power and rear lens units 53 and 54 having a negative power. The binoculars are further provided with a focusing mechanism, which is constructed as follows. When a focusing axle 13 is rotated by operating a focusing ring 14 fixed on the focusing axle 13, then, with the help of a threaded portion 15 on the focusing axle 13 and a nut 16 thread-engaged therewith, a wing plate 33 fixed to the nut 16 moves along the focusing axle 13. As a result, the rear lens units 53 and 54, which are engaged with the wing plate 33, move along the focusing axle 13, and thus focusing is achieved. On the other hand, the erecting prism systems 3 and 4 are disposed in such a way that they can be moved in a direction perpendicular to optical axes 29 and 30, and are pressed by springs 55 and 56 so as to be in constant contact with the peripheral surface of a cam 57 fixed on the focusing axle 13. As a result, the erecting prism systems 3 and 4 are decentered translationally according to the radius of the cam 57. The shape of the cam 57 is shown in FIG. 9. The cam 57 has a uniform radius at its portion 58 that corresponds to rotational angles of the focusing axle 13 for the range of object distances from infinite to 10 m, so that the erecting prism systems 3 and 4 are not decentered translationally in that range. The cam 57 has increasing radii at its portion 59 for the range of object distances from 10 m to the closest possible distance of 0.8 m, so that the erecting prism systems 3 and 4 are decentered translationally in that range.

According to the above described construction, as shown in FIG. 7B, at close distances, when the focusing axle 13 is rotated, the rear lens units 53 and 54 move to achieve focusing. At the same time, the cam 57 is rotated, and, in the range of object distances from 10 m to the closest possible distance of 0.8 m, the distance between the erecting prism systems 3 and 4 is increased as a result of translational decentering with respect to the optical axes 29 and 30, and thus the convergence angle at close distances is corrected. On the other hand, in the range of object distances from infinite to 10 m, since the erecting prism systems 3 and 4 are not decentered, the convergence angle is not corrected.

Figure 10:
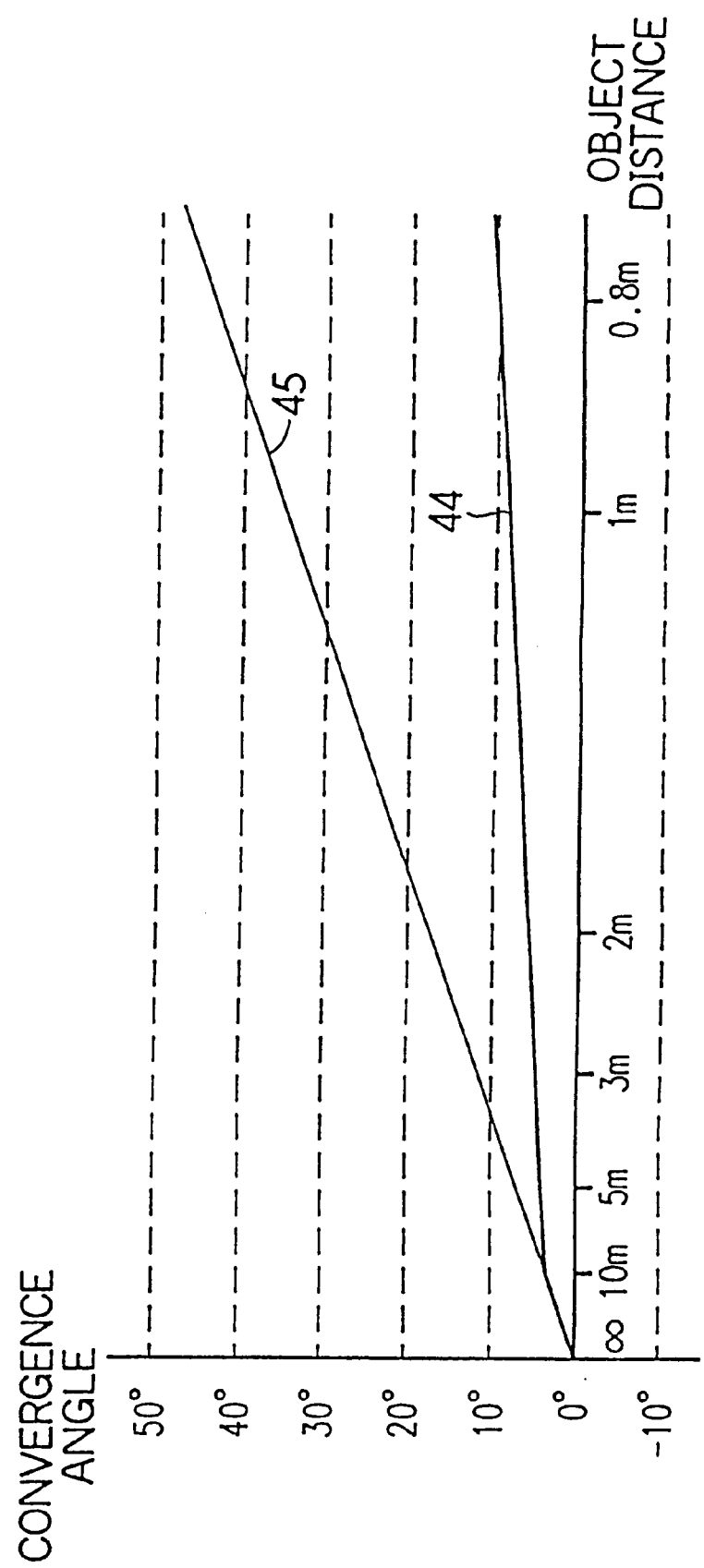
FIG. 10 is a diagram showing the relationship between object distance and convergence angle in the third embodiment.

FIG. 10 shows the relationship between object distance and convergence angle in this embodiment. As shown by the graph 44, in the range of object distances from infinite to 10 m, the convergence angle is not corrected, whereas, in the range of object distances from 10 m to 0.8 m, which is the closest possible distance within the range in which focusing is possible, the convergence angle is corrected in such a way that a part of the convergence angle is left uncorrected. The proportion of the uncorrected part of the convergence angle is so defined that it increases as the object distance becomes closer. Accordingly, it is possible to obtain natural convergence angles, such that do not strain the observers' eyes, according to the distance of the object. Moreover, since the erecting prism systems 3 and 4 are not decentered translationally in the range of object distances from infinite to 10 m, it is possible to prevent strain to the eyes as caused by making the eye axes diverge when an observer of a positive diopter uses the binoculars at nearly infinite distances. Furthermore, it is possible to eliminate deterioration of images as caused by decentering of lenses for convergence angle correction at far distances, where images tend to be intricate. As a means for correcting the convergence angle with a part of it left uncorrected as described above, it is possible to use, as well as a mechanical convergence correction means as is used in the above embodiments, an electrical convergence correction means that uses an actuator or the like to decenter or drive optical elements.

Fourth Embodiment

Figure 11A:
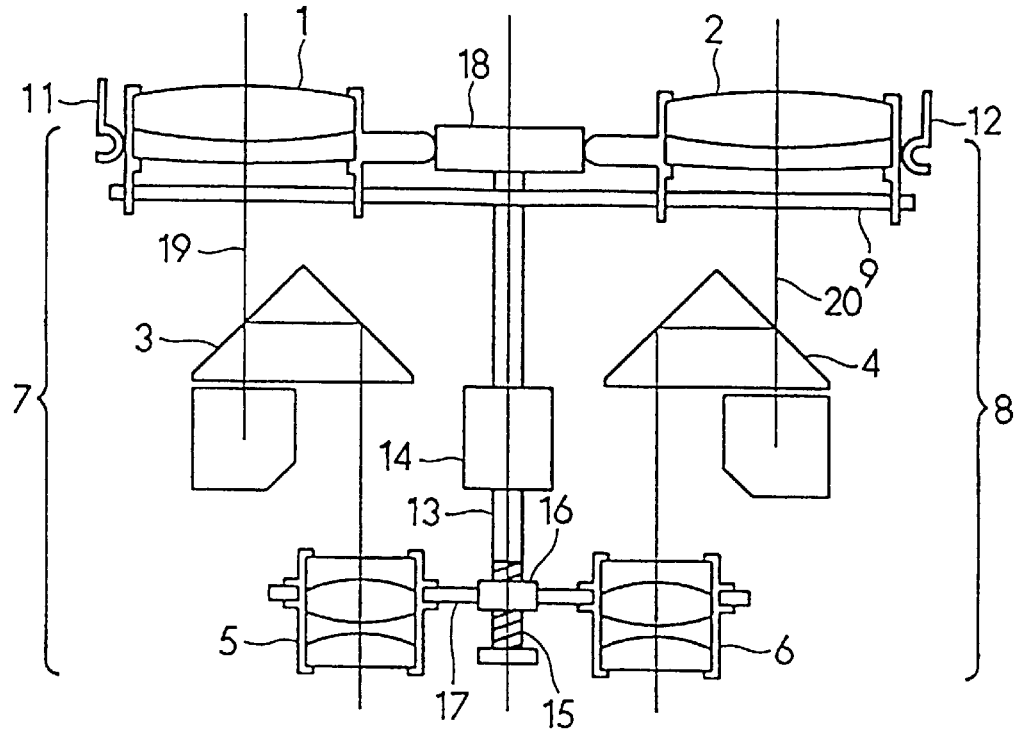
FIG. 11A is a plan view showing the internal construction in the infinite-distance state of the binoculars of a fourth embodiment of the present invention.
Figure 11B:
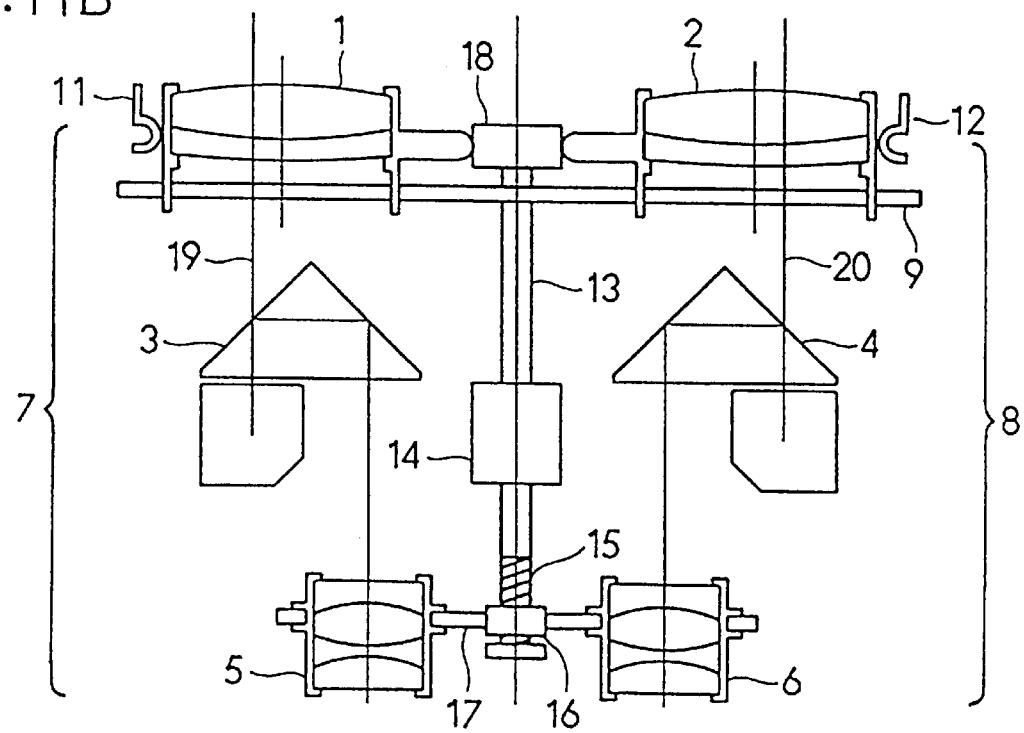
FIG. 11B is a plan view showing the internal construction in the close-distance state of the binoculars of the fourth embodiment.
Figure 12:
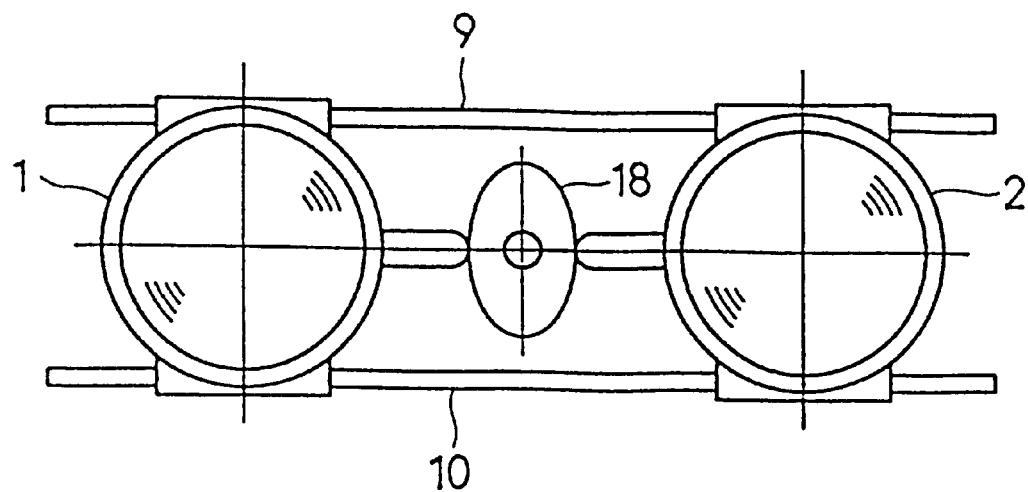
FIG. 12 is a front view of the binoculars of the fourth embodiment.

FIGS. 11A, 11B, and 12 show binoculars of a fourth embodiment of the present invention. FIG. 11A is a plan view showing the internal construction of the binoculars in the infinite-distance state, FIG. 11B is a plan view showing the internal construction of the binoculars in the close-distance state, and FIG. 12 is a front view. The binoculars of this embodiment are provided with a pair of optical systems 7 and 8, comprising right and left objective optical systems 1 and 2, erecting prism systems 3 and 4, and eyepiece optical systems 5 and 6, and are further provided with a focusing mechanism and a decentering mechanism. The focusing and decentering mechanisms are constructed as follows. A focusing ring 14 is fixed in the middle of a focusing axle 13, and an elliptic cam 18 is fixed at the front end of the focusing axle 13. At the rear end of the focusing axle 13 is provided a threaded portion 15, with which a nut 16 is thread-engaged. The objective optical systems 1 and 2 are disposed in such a way that they can be moved in a direction perpendicular to optical axes 19 and 20 along upper and lower guide bars 9 and 10 disposed perpendicularly to the focusing axle 13. Moreover, the objective optical systems 1 and 2 are pressed by springs 11 and 12 so as to be in constant contact with the peripheral surface of the cam 18. On the other hand, the eyepiece optical systems 5 and 6 are engaged with a wing plate 17 fixed to the nut 16.

According to the above described construction, as shown in FIG. 11B, at close distances, when the focusing axle 13 is rotated by rotating the focusing ring 14, the wing plate 17 moves along the focusing axle 13 with the help of the threaded portion 15 and the nut 16. As a result, the eyepiece optical systems 5 and 6 move in the same direction, and thus focusing is achieved. At the same time, as the cam 18 rotates, the distance between the objective optical systems 1 and 2 decreases as a result of translational decentering with respect to the optical axes 19 and 20, and thus the convergence angle at close distances is corrected. Here, since the convergence angle is corrected, as described above, by translationally decentering only the objective optical systems 1 and 2, it is no more necessary to move the whole optical systems 7 and 8, and accordingly it is possible to reduce the sizes of movable components, and thus to make the construction of the binoculars compact and simple.

Fifth Embodiment

Figure 13A:
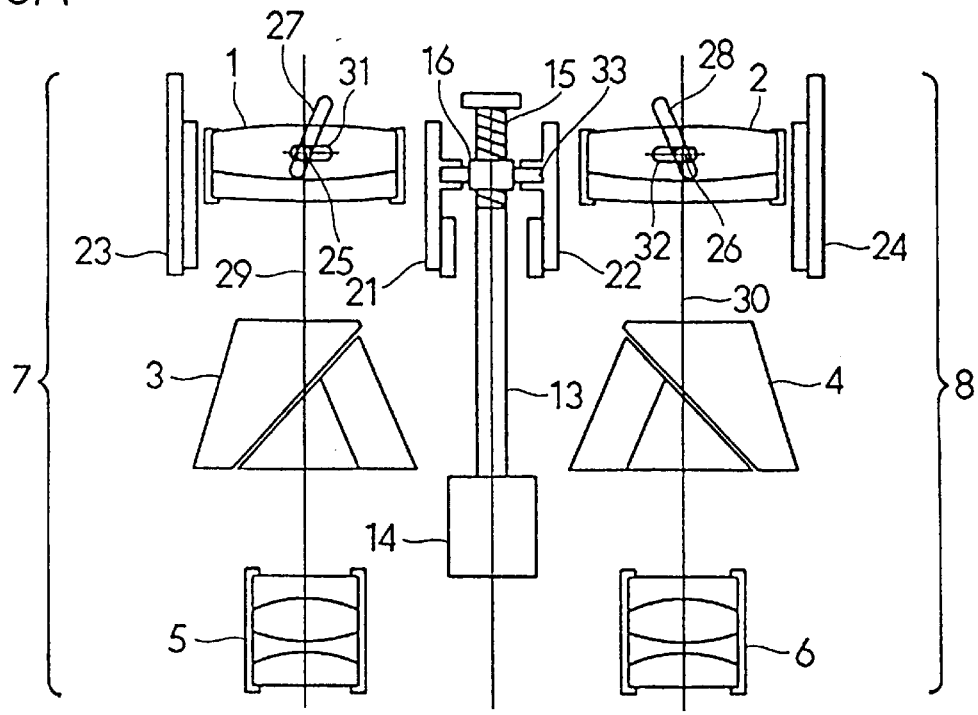
FIG. 13A is a plan view showing the internal construction in the infinite-distance state of the binoculars of a fifth embodiment of the present invention.
Figure 13B:
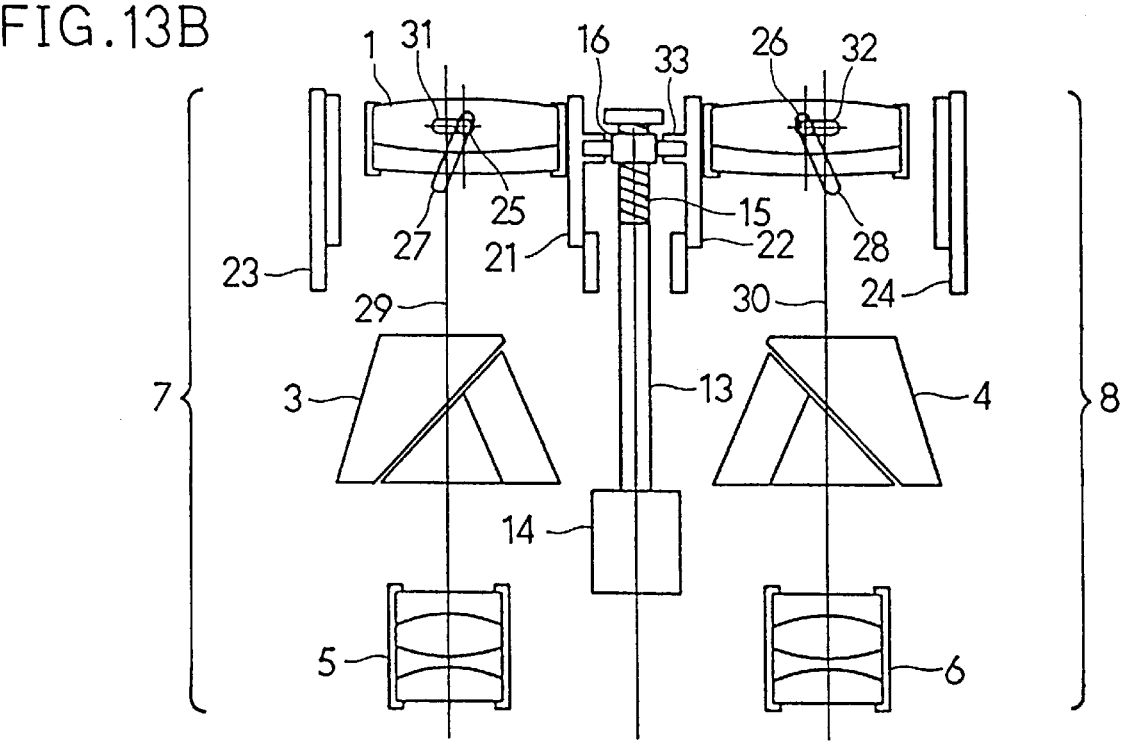
FIG. 13B is a plan view showing the internal construction in the close-distance state of the binoculars of the fifth embodiment.
Figure 14:
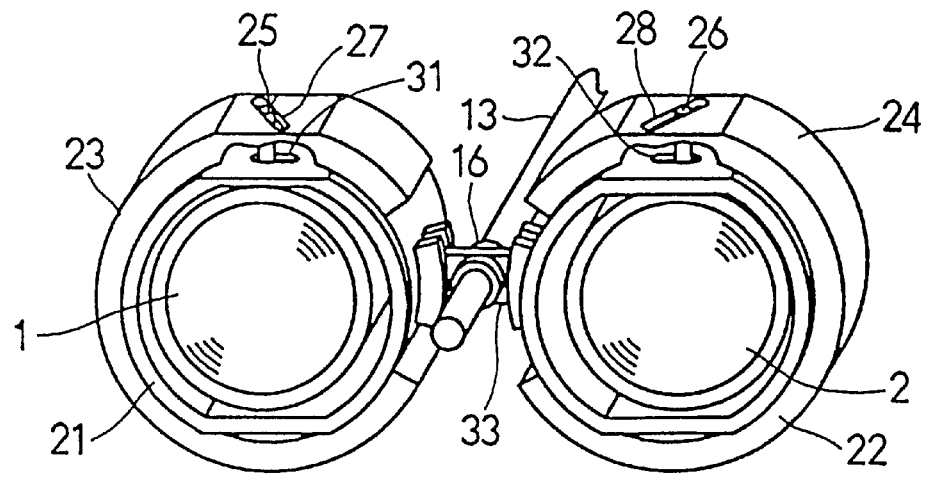
FIG. 14 is a perspective view of the portion around the objective optical systems of the binoculars of the fifth embodiment.

FIGS. 13A, 13B, and 14 show binoculars of a fifth embodiment of the present invention. FIG. 13A is a plan view showing the internal construction of the binoculars in the infinite-distance state, FIG. 13B is a plan view showing the internal construction of the binoculars in the close-distance state, and FIG. 14 is a perspective view of the portion around the objective optical systems. The binoculars of this embodiment are provided with a pair of optical systems 7 and 8, comprising right and left objective optical systems 1 and 2, erecting prism systems 3 and 4, and eyepiece optical systems 5 and 6, and are further provided with a focusing mechanism. The focusing mechanism of this embodiment is constructed, differently from that for the fourth embodiment, as follows. A wing plate 33 is fixed to a nut 16, which is thread-engaged with a threaded portion 15 at the end of a focusing axle 13. With the wing plate 33 are engaged objective barrels 21 and 22 that accommodate the objective optical systems 1 and 2. The objective barrels 21 and 22 are disposed in lens barrels 23 and 24 in such a way that they can be moved along optical axes 29 and 30. Moreover, the objective optical systems 1 and 2 are disposed in the objective barrels 21 and 22 in such a way that they can be moved in a direction perpendicular to the optical axes 29 and 30. This is achieved with the help of pins 25 and 26 that are fixed on the objective optical systems 1 and 2 and are guided along laterally extending grooves 31 and 32 provided in the upper parts of the objective barrels 21 and 22. Furthermore, the pins 25 and 26 are also engaged with cam grooves 27 and 28, which are so designed that the distance between them decreases as they approach the front ends. Note that the objective barrels 21 and 22, which are engaged with the wing plate 33 in an axial direction, are left free to move in a lateral direction. This relationship between the objective barrels and the wing plate holds also in the sixth to eighth embodiments that will be described later.

According to the above described construction, as shown in FIG. 13B, at close distances, when the focusing axle 13 is rotated by rotating the focusing ring 14, the wing plate 33 moves along the focusing axle 13 with the help of the threaded portion 15 and the nut 16. As a result, the objective optical systems 1 and 2, guided by the lens barrels 23 and 24, move in the same direction, and thus focusing is achieved. At the same time, with the help of the pins 25 and 26 guided along the cam grooves 27 and 28, the distance between the objective optical systems 1 and 2 decreases as a result of translational decentering with respect to the optical axes 29 and 30, and thus the convergence angle at close distances is corrected. Also here, since the convergence angle is corrected by translationally decentering only the objective optical systems 1 and 2, it is no more necessary to move the whole optical systems 7 and 8, and accordingly it is possible to reduce the sizes of movable components, and thus to make the construction of the binoculars compact and simple.

Sixth Embodiment

Figure 15:
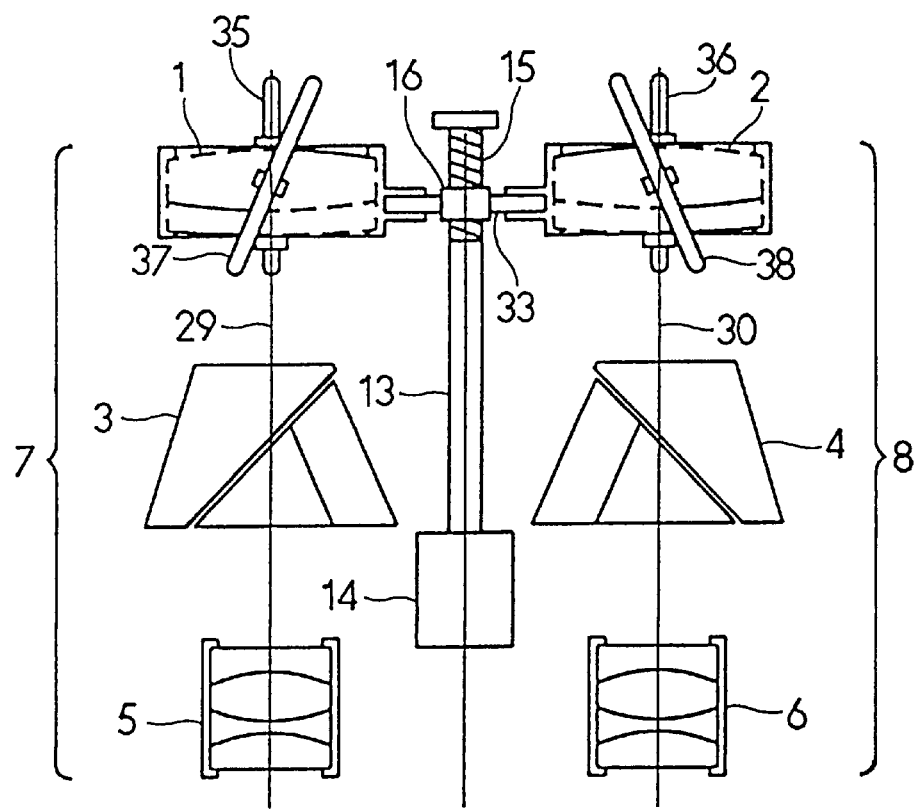
FIG. 15 is a plan view of the internal construction of the binoculars of a sixth embodiment of the present invention.
Figure 16:
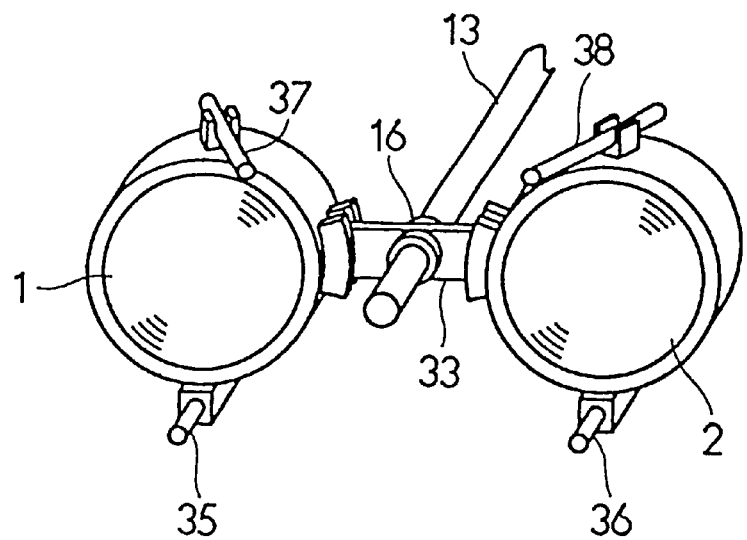
FIG. 16 is a perspective view of the portion around the objective optical systems of the binoculars of the sixth embodiment.

FIGS. 15 and 16 show binoculars of a sixth embodiment of the present invention. FIG. 15 is a plan view showing the internal construction of the binoculars, and FIG. 16 is a perspective view of the portion around the objective optical systems. The binoculars of this embodiment are provided with a pair of optical systems 7 and 8, comprising objective optical systems 1 and 2, erecting prism systems 3 and 4, and eyepiece optical systems 5 and 6, and are further provided with a focusing mechanism. The focusing mechanism of this embodiment is constructed, differently from that for the fourth embodiment, as follows. When a focusing axle 13 is rotated by rotating a focusing ring 14 fixed on the focusing axle 13, then, with the help of a threaded portion 15 on the focusing axle 13 and a nut 16 thread-engaged therewith, a wing plate 33 fixed to the nut 16 moves along the focusing axle 13. As a result, the objective optical systems 1 and 2, which are engaged with the wing plate 33, move along the focusing axle 13, and thus focusing is achieved. Meanwhile, the objective optical systems 1 and 2 move along guide bars 35 and 36 disposed parallel to optical axes 29 and 30. To prevent rotation about the guide bars 35 and 36, auxiliary bars 37 and 38 are disposed, as shown in FIG. 16, at an angle to the optical axes 29 and 30 on a plane including the optical axes 29 and 30. Accordingly, as the objective optical systems 1 and 2 move along the guide bars 35 and 36, the objective optical systems 1 and 2 incline about the guide bars 35 and 36 because the auxiliary bars 37 and 38 are disposed at an angle. As a result, the objective optical systems 1 and 2 are decentered translationally with respect to the optical axes 29 and 30.

According to the above described construction, at close distances, when the focusing axle 13 is rotated, the objective optical systems 1 and 2 move along the optical axes 29 and 30, and thus focusing is achieved. At the same time, with the help of the auxiliary bars 37 and 38, the distance between the objective optical systems 1 and 2 decreases as a result of translational decentering thereof with respect to the optical axes 29 and 30, and thus the convergence angle at close distances is corrected.

Seventh Embodiment

Figure 17:
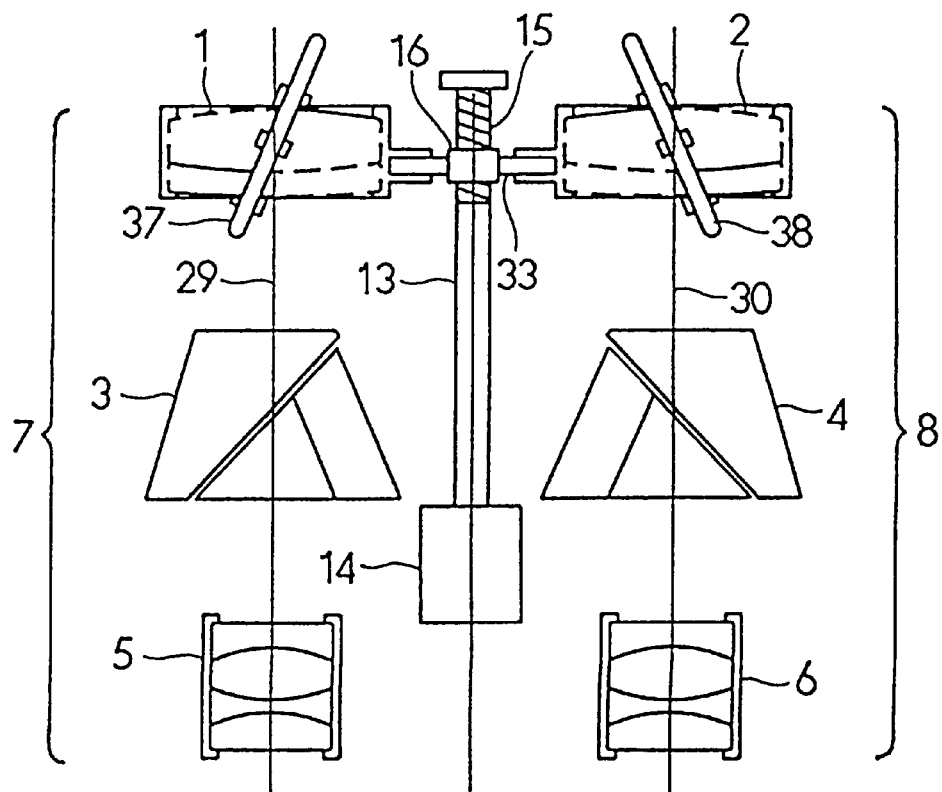
FIG. 17 is a plan view of the internal construction of the binoculars of a seventh embodiment of the present invention.
Figure 18:
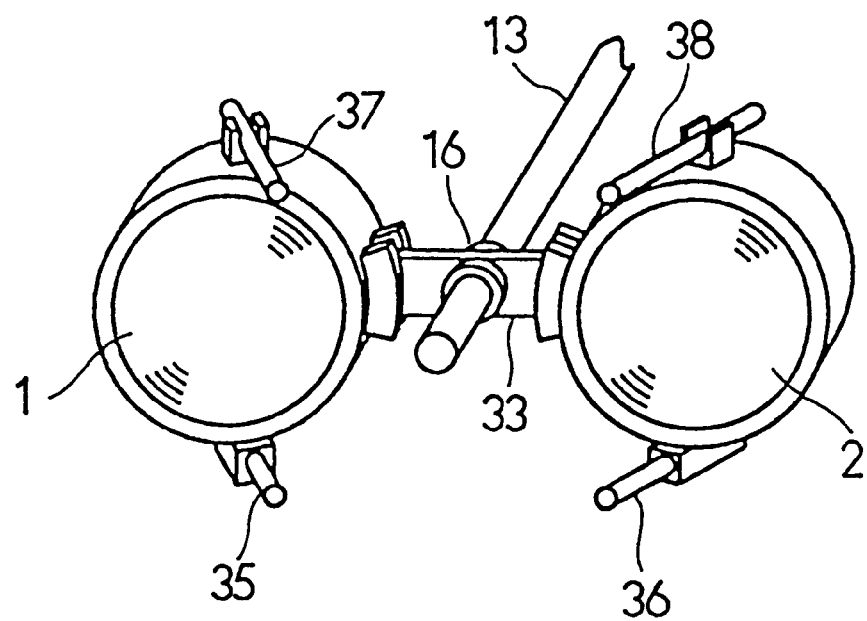
FIG. 18 is a perspective view of the portion around the objective optical systems of the binoculars of the seventh embodiment.

FIGS. 17 and 18 show binoculars of a seventh embodiment of the present invention. FIG. 17 is a plan view showing the internal construction of the binoculars, and FIG. 18 is a perspective view of the portion around the objective optical systems. The binoculars of this embodiment has the same construction as in the sixth embodiment except that the guide bars 35 and 36 are disposed parallel to the auxiliary bars 37 and 38 that are disposed at an angle. According to this construction, at close distances, when the focusing axle 13 is rotated, the objective optical systems 1 and 2 move to achieve focusing. At the same time, since the objective optical systems 1 and 2 move obliquely, the distance between them decreases as a result of translational decentering with respect to the optical axes 29 and 30, and thus the convergence angle at close distances is corrected. Note that, instead of using the guide bars 35 and 36 as guide members for guiding the movement of the objective optical systems 1 and 2 as in this embodiment, it is also possible to provide guides by engaging the outer surfaces of the objective barrels (not shown in the figure) that accommodate the objective optical systems 1 and 2 with the inner surfaces of the lens barrels (not shown in the figure). In this case, the engaging surfaces, namely the outer surfaces of the objective barrels and the inner surfaces of the lens barrels, need to be arranged at an angle to the optical axes 29 and 30 of the objective optical systems 1 and 2.

In the sixth and seventh embodiments, since the objective optical systems 1 and 2 are translationally decentered by means of guide members that are disposed at an angle, it is possible to share components between the focusing and decentering mechanisms, and thus to reduce the number of components. As against the fourth to seventh embodiments described above, where focusing is achieved by moving the whole objective optical systems 1 and 2 or the whole eyepiece optical systems 5 and 6, it is also possible to achieve focusing by moving only part of the objective optical systems 1 and 2 or part of the eyepiece optical systems 5 and 6, as in the eighth embodiment that will be described below.

Eighth Embodiment

Figure 19A:
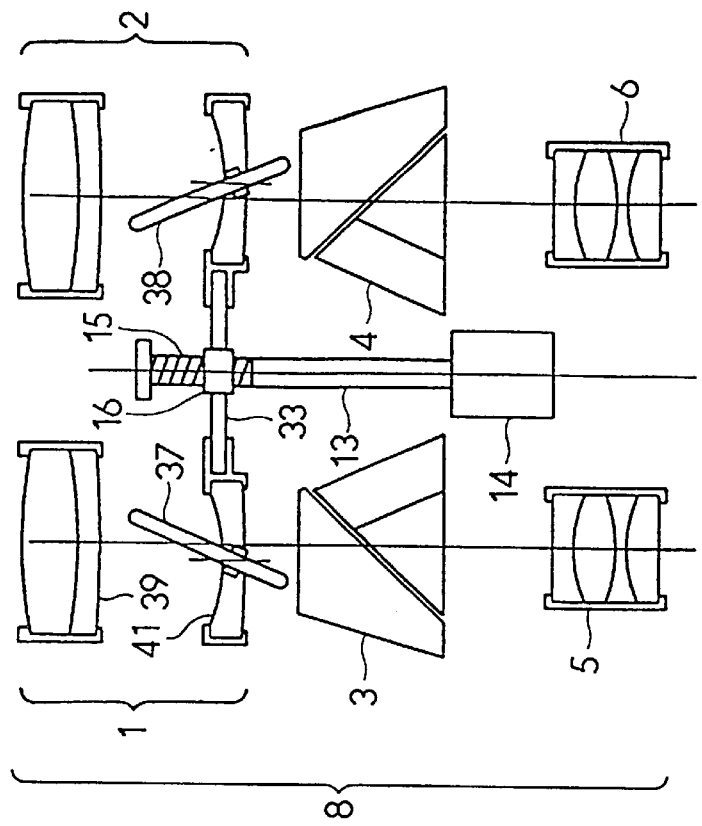
FIG. 19A is a plan view showing the internal construction in the infinite-distance state of the binoculars of an eighth embodiment of the present invention.
Figure 19B:
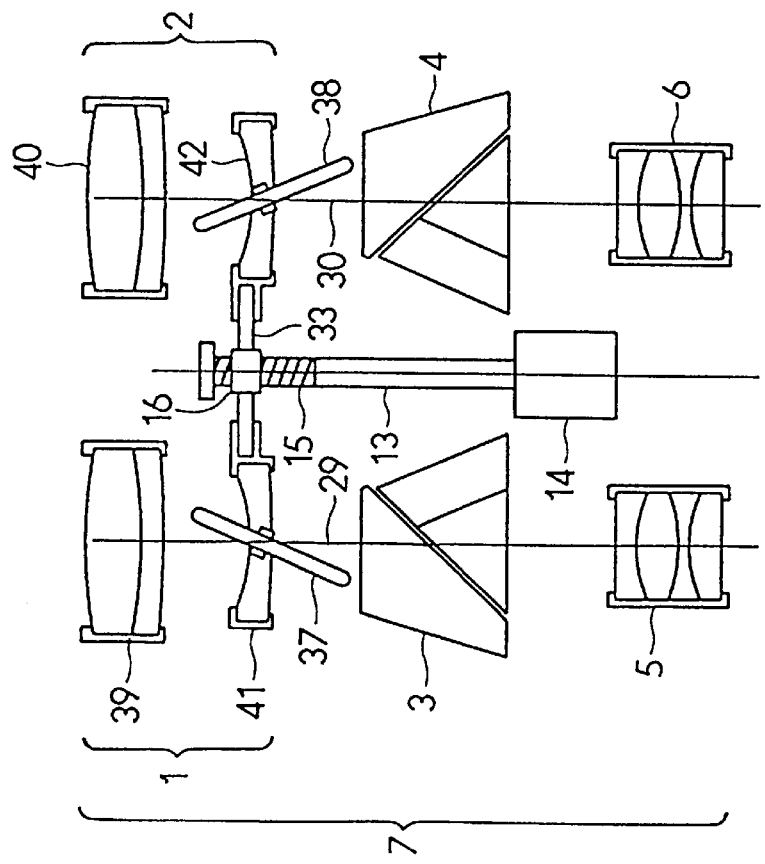
FIG. 19B is a plan view showing the internal construction in the close-distance state of the binoculars of the eighth embodiment.

FIGS. 19A and 19B show binoculars of a eighth embodiment of the present invention. FIG. 19A is a plan view showing the internal construction of the binoculars in the infinite-distance state, and FIG. 19B is a plan view showing the internal construction of the binoculars in the close-distance state. In the binoculars of this embodiment, the objective optical systems 1 and 2 comprise front lens units 39 and 40 having a positive power, and rear lens units 41 and 42 having a negative power. And, the rear lens units 41 and 42 are provided with guide bars 35 and 36 and auxiliary bars 37 and 38, which are similar to the guide bars 35 and 36 and the auxiliary bars 37 and 38 with which the objective optical systems 1 and 2 of the seventh embodiment are provided. In other respects, the binoculars of this embodiment has the same construction as in the seventh embodiment. Therefore, when a focusing axle 13 is rotated by rotating a focusing ring 14 fixed on the focusing axle 13, then, with the help of a threaded portion 15 on the focusing axle 13 and a nut 16 thread-engaged therewith, a wing plate 33 fixed to the nut 16 moves along the focusing axle 13. As a result, the rear lens units 41 and 42, which are engaged with the wing plate 33, move along the focusing axle 13, and thus focusing is achieved. Meanwhile, the rear lens units 41 and 42, guided by the guide bars 35 and 36 and the auxiliary bars 37 and 38, move obliquely, decentering themselves translationally with respect to the optical axes 29 and 30.

According to the above described construction, at close distances, when the focusing axle 13 is rotated, the rear lens units 41 and 42 move to achieve focusing. At the same time, the distance between them decreases as a result of translational decentering with respect to the optical axes 29 and 30, and thus the convergence angle at close distances is corrected.

According to one aspect of the present invention, since the convergence angle is corrected by translationally decentering the objective optical element with respect to the optical axis, it is possible to reduce the number of movable members that are moved to correct the convergence angle. For example, to achieve translational decentering, the objective optical element is moved in a direction at an angle to the optical axis. As a result, it is possible to construct binoculars as a whole in a simple, compact, and light construction. Moreover, since correction of the convergence angle does not necessitate a new optical element such as a variable-vertex-angle prism, it is possible to manufacture binoculars accordingly simply and inexpensively.

According to another aspect of the present invention, since translational decentering of the objective optical element is interlocked with the focusing mechanism so as to be performed at the same time as focusing, it is possible to share components between the focusing and decentering mechanisms, and thus to reduce the number of components and the time for assembly.

According to still another aspect of the present invention, the convergence correction means does not correct the convergence angle completely but leaves a certain degree of convergence angle uncorrected. As a result, it is possible to obtain moderate convergence angles that do not strain the eyes, and thus to obtain natural views with which the observer do not feel unnaturalness. Especially, it is possible to eliminate the possibility that, when the observer turns the eyes from a distant object to a close object, the right and left images do not merged into one.

According to a further aspect of the present invention, the convergence angle correction means corrects the convergence angle only when focusing is performed for distances closer than a predetermined distance. As a result, it is possible to prevent observers of certain diopters from being required to make the eye axes to diverge, and thus to reduce strain to the eyes. Furthermore, since there is no need to deflect light beams for convergence angle correction by use of prisms having decentered lenses, it is possible to eliminate deterioration of images at far distances, where images tend to be intricate.

What is claimed is:

1. A binocular, comprising:
an objective optical unit;
an erecting optical element for erecting an image of the objective optical unit;
a focusing mechanism for varying a dioptric power of the binocular; and
a convergence angle correction mechanism interlocked with said focusing mechanism for correcting a convergence angle of the binocular by moving said erecting optical element,
wherein said convergence angle correction mechanism is so constructed that it leaves a predetermined degree of convergence angle uncorrected.

2. A binocular, comprising;
an objective optical unit;
an erecting optical element for erecting an image of the objective optical unit;
a focusing mechanism for varying a dioptric power of the binocular; and
a convergence angle correction mechanism interlocked with said focusing mechanism, for correcting a convergence angle of the binocular only when said focusing mechanism adjusts the dioptric power to a distance closer than a predetermined distance by moving said erecting optical element.

3. A binocular, comprising:
a focusing mechanism for varying a dioptric power of the binocular, and
a convergence angle correction mechanism interlocked with said focusing mechanism for correcting a convergence angle of the binocular,
wherein said convergence angle correction mechanism leaves a predetermined degree of convergence angle uncorrected so that the convergence angle is greater than zero.

4. A binocular as claimed in claim 3,
wherein the predetermined degree is in a range from 1.8° to 15° when the binocular are focused for a closest possible distance.

5. A binocular as claimed in claim 4,
wherein the predetermined degree is approximately equal to a convergence angle in naked-eye observation.

6. A binocular as claimed in claim 4, further comprising:
an objective optical element,
wherein said convergence angle correction mechanism corrects the convergence angle by moving said objective optical element.

7. A binocular as claimed in claim 6, further comprising:
an erecting optical element
wherein said convergence angle correction mechanism corrects the convergence angle by moving said erecting optical element.

8. A binocular, comprising:
a focusing mechanism for varying a dioptric power of the binocular; and
a convergence angle correction mechanism interlocked with said focusing mechanism, for correcting a convergence angle of the binocular only when said focusing mechanism adjusts the dioptric power to a distance closer than a predetermined distance so that the convergence angle is left uncorrected when said focusing mechanism adjusts the dioptric power to a distance further than said predetermined distance.

9. A binocular as claimed in claim 8,
wherein said convergence angle correction mechanism is so constructed that it leaves a predetermined degree of convergence angle.

10. A binocular as claimed in claim 9,
wherein the predetermined degree is in a range from 1.8° to 15° when the binocular are focused for a closest possible distance.

11. A binocular as claimed in claim 10,
wherein the predetermined degree is approximately equal to a convergence angle in naked-eye observation.

12. A binocular as claimed in claim 8, further comprising:
an objective optical element,
wherein said convergence angle correction mechanism corrects the convergence angle by moving said objective optical element.

13. A binocular as claimed in claim 8, further comprising:
an erecting optical element,
wherein said convergence angle correction mechanism corrects the convergence angle by moving said erecting optical element.

14. A binocular, comprising:
a first eyepiece optical element positioned on a first optical axis;
a second eyepiece optical element positioned on a second optical axis, the first and second optical axis are parallel;
a first objective optical element positioned on the first optical axis for providing an image to the first eyepiece optical element;
a second objective optical element positioned on the second optical axis for providing an image to the second eyepiece optical element; and
a moving mechanism for moving only the first and second objective optical elements translationally to decenter each of the first and second objective optical elements from their respective optical axes so that a convergence angle is only partially corrected at a close distance.

* * * * *